United States Patent
Dror et al.

(10) Patent No.: US 9,946,775 B2
(45) Date of Patent: Apr. 17, 2018

(54) SYSTEM AND METHODS THEREOF FOR DETECTION OF USER DEMOGRAPHIC INFORMATION

(71) Applicant: Innovid Inc., New York, NY (US)

(72) Inventors: Omer Dror, Tel Aviv (IL); Niv Mizrahi, Reshon Lezion (IL)

(73) Assignee: Taykey Ltd., Herzliya (IL)

( * ) Notice: Subject to any disclaimer, the term of this patent is extended or adjusted under 35 U.S.C. 154(b) by 0 days.

(21) Appl. No.: 13/709,396

(22) Filed: Dec. 10, 2012

(65) Prior Publication Data
US 2013/0103637 A1    Apr. 25, 2013

Related U.S. Application Data

(63) Continuation-in-part of application No. 13/482,473, filed on May 29, 2012, now Pat. No. 8,782,046, which is a continuation-in-part of application No. 13/279,673, filed on Oct. 24, 2011, now Pat. No. 9,183,292, and a continuation-in-part of application No. 13/050,515, filed on Mar. 17, 2011, now Pat. No. 8,930,377.

(60) Provisional application No. 61/316,844, filed on Mar. 24, 2010, provisional application No. 61/725,120, filed on Nov. 12, 2012.

(51) Int. Cl.
    *G06F 17/30*    (2006.01)
(52) U.S. Cl.
    CPC .. *G06F 17/30563* (2013.01); *G06F 17/30734* (2013.01)
(58) Field of Classification Search
    CPC ............... G06F 17/30563; G06F 17/30734

USPC ................. 707/748, 602, E17.058
See application file for complete search history.

(56) References Cited

U.S. PATENT DOCUMENTS

| | | | |
|---|---|---|---|
| 6,463,430 B1 | 10/2002 | Brady et al. |
| 6,523,021 B1 | 2/2003 | Monberg et al. |
| 7,016,936 B2 | 3/2006 | Wilkinson et al. |
| 7,035,864 B1 | 4/2006 | Ferrari et al. |

(Continued)

FOREIGN PATENT DOCUMENTS

| | | |
|---|---|---|
| JP | 2000305952 | 11/2000 |
| KR | 20090034052 | 4/2009 |

(Continued)

OTHER PUBLICATIONS

Wang et al., A Collaborative Filtering Recommendation Algorithm Using User Implicit Demographic Information, The 7th International Conference on Computer Science & Education (ICCSE 2012) Jul. 14-17, 2012, Melbourne, Australia, pp. 935-939. (Year: 2012).*

(Continued)

*Primary Examiner* — Phuong Thao Cao
(74) *Attorney, Agent, or Firm* — M&B IP Analysts, LLC

(57) ABSTRACT

A system and method for detecting implicit information related to a user are disclosed. The system comprises a network interface for accessing one or more data sources; a plurality of agents for collecting textual content from the one or more data sources; a processing unit for extracting explicit demographic information related to the user and generating implicit demographic information related to the user respective of the explicit demographic information; and a data warehouse connected to the processing unit for storing the generated implicit demographic information.

18 Claims, 6 Drawing Sheets

(56) References Cited

U.S. PATENT DOCUMENTS

| | | | |
|---|---|---|---|
| 7,062,483 B2 | 6/2006 | Ferrari et al. | |
| 7,389,252 B2 | 6/2008 | Robb et al. | |
| 7,409,404 B2 | 8/2008 | Gates | |
| 7,426,499 B2 | 9/2008 | Eder | |
| 7,428,554 B1 | 9/2008 | Coberley et al. | |
| 7,433,876 B2 | 10/2008 | Spivack et al. | |
| 7,478,089 B2 | 1/2009 | Henkin et al. | |
| 7,543,232 B2 | 6/2009 | Easton, Jr. et al. | |
| 7,567,957 B2 | 7/2009 | Ferrari et al. | |
| 7,617,184 B2 | 11/2009 | Ferrari et al. | |
| 7,620,628 B2 | 11/2009 | Kapur et al. | |
| 7,657,493 B2 | 2/2010 | Meijer et al. | |
| 7,788,126 B2 | 8/2010 | Wagner et al. | |
| 7,865,354 B2 | 1/2011 | Chitrapura et al. | |
| 7,890,382 B2 | 2/2011 | Robb et al. | |
| 7,930,197 B2 | 4/2011 | Ozzie et al. | |
| 8,010,402 B1* | 8/2011 | Sharma et al. | 705/7.29 |
| 8,090,613 B2 | 1/2012 | Kalb et al. | |
| 8,495,143 B2* | 7/2013 | Zhou | G06Q 10/10 705/14.66 |
| 8,515,937 B1* | 8/2013 | Sun et al. | 707/707 |
| 8,583,659 B1* | 11/2013 | Alexandrescu | G06F 17/3053 707/705 |
| 8,600,796 B1* | 12/2013 | Sterne et al. | 705/7.33 |
| 8,631,122 B2* | 1/2014 | Kadam et al. | 709/224 |
| 8,818,788 B1* | 8/2014 | Mihalik et al. | 704/1 |
| 8,886,836 B2* | 11/2014 | Luu | G06Q 30/0251 705/1.1 |
| 2004/0003402 A1* | 1/2004 | McKenna, Jr. | 725/46 |
| 2004/0034561 A1 | 2/2004 | Smith | |
| 2005/0091200 A1 | 4/2005 | Melton et al. | |
| 2006/0010029 A1* | 1/2006 | Gross | 705/10 |
| 2006/0242017 A1 | 10/2006 | Libes et al. | |
| 2007/0050389 A1 | 3/2007 | Kim et al. | |
| 2007/0100779 A1 | 5/2007 | Levy et al. | |
| 2007/0106627 A1 | 5/2007 | Srivastava et al. | |
| 2007/0143296 A1 | 6/2007 | Casion | |
| 2007/0192300 A1 | 8/2007 | Reuther et al. | |
| 2007/0208728 A1* | 9/2007 | Zhang et al. | 707/5 |
| 2007/0276676 A1 | 11/2007 | Hoenig et al. | |
| 2008/0027769 A1 | 1/2008 | Eder | |
| 2008/0052630 A1 | 2/2008 | Rosenbaum et al. | |
| 2008/0082463 A1 | 4/2008 | Cheng et al. | |
| 2008/0109285 A1 | 5/2008 | Reuther et al. | |
| 2008/0126411 A1* | 5/2008 | Zhuang et al. | 707/104.1 |
| 2008/0133488 A1* | 6/2008 | Bandaru et al. | 707/3 |
| 2008/0140711 A1* | 6/2008 | Hyder et al. | 707/104.1 |
| 2008/0189269 A1 | 8/2008 | Olsen | |
| 2008/0208820 A1 | 8/2008 | Usey et al. | |
| 2008/0215607 A1* | 9/2008 | Kaushansky et al. | 707/102 |
| 2008/0243531 A1 | 10/2008 | Hyder et al. | |
| 2008/0249764 A1 | 10/2008 | Huang et al. | |
| 2008/0250065 A1* | 10/2008 | Barrs et al. | 707/104.1 |
| 2008/0263589 A1 | 10/2008 | Jacobson et al. | |
| 2008/0281915 A1 | 11/2008 | Elad et al. | |
| 2008/0306935 A1* | 12/2008 | Richardson et al. | 707/5 |
| 2009/0006525 A1* | 1/2009 | Moore | 709/202 |
| 2009/0077069 A1 | 3/2009 | Polanyi et al. | |
| 2009/0113468 A1 | 4/2009 | Steelberg et al. | |
| 2009/0119179 A1 | 5/2009 | Kolve et al. | |
| 2009/0125374 A1 | 5/2009 | Deaton et al. | |
| 2009/0164400 A1 | 6/2009 | Amer-Yahia et al. | |
| 2009/0164897 A1 | 6/2009 | Amer-Yahia et al. | |
| 2009/0193011 A1* | 7/2009 | Blair-Goldensohn | G06F 17/30719 |
| 2009/0216581 A1 | 8/2009 | Carrier et al. | |
| 2009/0216757 A1* | 8/2009 | Sen et al. | 707/5 |
| 2009/0240586 A1* | 9/2009 | Ramer et al. | 705/14 |
| 2009/0292584 A1* | 11/2009 | Dalal et al. | 705/10 |
| 2009/0299826 A1* | 12/2009 | Hyder et al. | 705/10 |
| 2010/0004974 A1 | 1/2010 | Libby et al. | |
| 2010/0036718 A1 | 2/2010 | Hamilton, II et al. | |
| 2010/0042403 A1* | 2/2010 | Chandrasekar et al. | 704/9 |
| 2010/0050118 A1 | 2/2010 | Chowdhury et al. | |
| 2010/0070293 A1 | 3/2010 | Brown et al. | |
| 2010/0100537 A1 | 4/2010 | Druzgalski et al. | |
| 2010/0138291 A1 | 6/2010 | Silverman et al. | |
| 2010/0138451 A1 | 6/2010 | Henkin et al. | |
| 2010/0195913 A1* | 8/2010 | Sharma et al. | 382/190 |
| 2010/0235219 A1 | 9/2010 | Merrick et al. | |
| 2010/0262454 A1 | 10/2010 | Sommer et al. | |
| 2010/0332304 A1 | 12/2010 | Higgins et al. | |
| 2011/0004483 A1* | 1/2011 | Ting et al. | 705/1.1 |
| 2011/0099207 A1 | 4/2011 | Brown et al. | |
| 2011/0112900 A1 | 5/2011 | Sanghavi | |
| 2011/0123016 A1 | 5/2011 | Segall et al. | |
| 2011/0137906 A1 | 6/2011 | Cai et al. | |
| 2011/0161312 A1 | 6/2011 | Wallman | |
| 2011/0213655 A1 | 9/2011 | Henkin et al. | |
| 2011/0225026 A1 | 9/2011 | Ketchum | |
| 2011/0225048 A1* | 9/2011 | Nair | G06Q 30/02 705/14.66 |
| 2011/0238485 A1* | 9/2011 | Haumont et al. | 705/14.41 |
| 2011/0251887 A1 | 10/2011 | Paul et al. | |
| 2011/0302026 A1* | 12/2011 | Kanakarajan et al. | 705/14.45 |
| 2012/0011158 A1* | 1/2012 | Avner | G06F 17/2785 707/777 |
| 2012/0110071 A1* | 5/2012 | Zhou | G06Q 10/10 709/204 |
| 2012/0124478 A1 | 5/2012 | King et al. | |
| 2012/0136959 A1* | 5/2012 | Kadam | G06F 17/30867 709/217 |
| 2012/0143965 A1* | 6/2012 | Parker et al. | 709/206 |
| 2012/0158461 A1 | 6/2012 | Aldrey et al. | |
| 2012/0166367 A1* | 6/2012 | Murdock et al. | 706/12 |
| 2012/0221386 A1 | 8/2012 | Netzer et al. | |
| 2012/0221406 A1 | 8/2012 | Kruhoeffer et al. | |
| 2012/0317198 A1* | 12/2012 | Patton | G06Q 10/10 709/204 |
| 2013/0024465 A1* | 1/2013 | Schiff et al. | 707/749 |
| 2013/0080222 A1* | 3/2013 | Quinn | 705/14.5 |
| 2013/0103637 A1* | 4/2013 | Dror et al. | 707/602 |
| 2013/0190004 A1* | 7/2013 | Papakipos et al. | 455/456.1 |
| 2013/0332523 A1* | 12/2013 | Luu | G06Q 30/0251 709/204 |
| 2014/0040171 A1* | 2/2014 | Segalov et al. | 706/12 |
| 2014/0099610 A1* | 4/2014 | Bak et al. | 434/236 |
| 2014/0136185 A1* | 5/2014 | Bhatt | 704/9 |
| 2014/0143250 A1* | 5/2014 | Martin | G06F 17/30598 707/737 |
| 2014/0337120 A1 | 11/2014 | Ercanbrack | |
| 2017/0308918 A1* | 10/2017 | Weiss | G06Q 30/0211 |

FOREIGN PATENT DOCUMENTS

| | | |
|---|---|---|
| KR | 20090068803 | 6/2009 |
| KR | 20090080822 | 7/2009 |

OTHER PUBLICATIONS

International Searching Authority, "International Search Report and Written Opinion" for the corresponding International Patent Application PCT/IL2011/028846; dated Sep. 28, 2011.

* cited by examiner

SYSTEM AND METHODS THEREOF FOR DETECTION OF USER DEMOGRAPHIC INFORMATION

CROSS-REFERENCE TO RELATED APPLICATIONS

This application claims the benefit of U.S. provisional application No. 61/725,120 filed on Nov. 12, 2012. This application is also a continuation-in-part of U.S. patent application Ser. No. 13/482,473 filed on May 29, 2012, which is a continuation-in-part of U.S. patent application Ser. No. 13/279,673 filed on Oct. 24, 2011 and also a continuation-in-part of U.S. patent application Ser. No. 13/050,515, filed on Mar. 17, 2011 which claims the benefit of U.S. provisional application No. 61/316,844 filed on Mar. 24, 2010. The contents of each of the above-referenced applications are incorporated herein by reference.

TECHNICAL FIELD

The invention generally relates to a system for extracting information from social networks, and more specifically to a system and methods for detecting demographic information respective of a user over the web using information extracted from social networks.

BACKGROUND

There is an abundance of information available on the Internet through content on web pages, social networks, user generated content, and other sources of information, which are all accessible via the world-wide web (WWW). Search systems make the access to such information speedy and generally cost effective. However, there are also certain disadvantages, one of which is the fact that even targeted searches for generally available information result in large amounts of 'hits' requiring the user to sift through a lot of unwanted information. The search is static by nature and over time, as more and more irrelevant data becomes available, the more difficult it is to get to meaningful information.

Various users of information are interested in a more elaborate analysis of the information available through the Internet as well as the time-value of such information. That is, older information may be less important than newer information and the trends relating to the information may be more interesting than the data relating to the information at any given point in time. Current solutions monitor online behavior, rather than attempting to reach intents. For example, today advertisers attempting to target customers can only do so based on where the customers go, what they do, and what they read on the web.

Today, advertising is all about demographics and does not handle true intent. However, advertisers are trying to target persons based on, for example, their age and music preferences. An effective way for detecting demographic information related to users in a broad sense would therefore be advantageous.

SUMMARY

Certain embodiments disclosed herein include a system for detecting implicit information related to a user. The system comprises a network interface for accessing one or more data sources; a plurality of agents for collecting textual content from the one or more data sources; a processing unit for extracting explicit demographic information related to the user and generating implicit demographic information related to the user respective of the explicit demographic information; and a data warehouse connected to the processing unit for storing the generated implicit demographic information.

Certain embodiments disclosed herein also include a method for detecting implicit demographic information related to a user. The method comprises collecting textual information from one or more data sources; extracting explicit demographic information revealed by the user; generating implicit demographic information related to the user; and storing the identified demographic information in the data warehouse.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
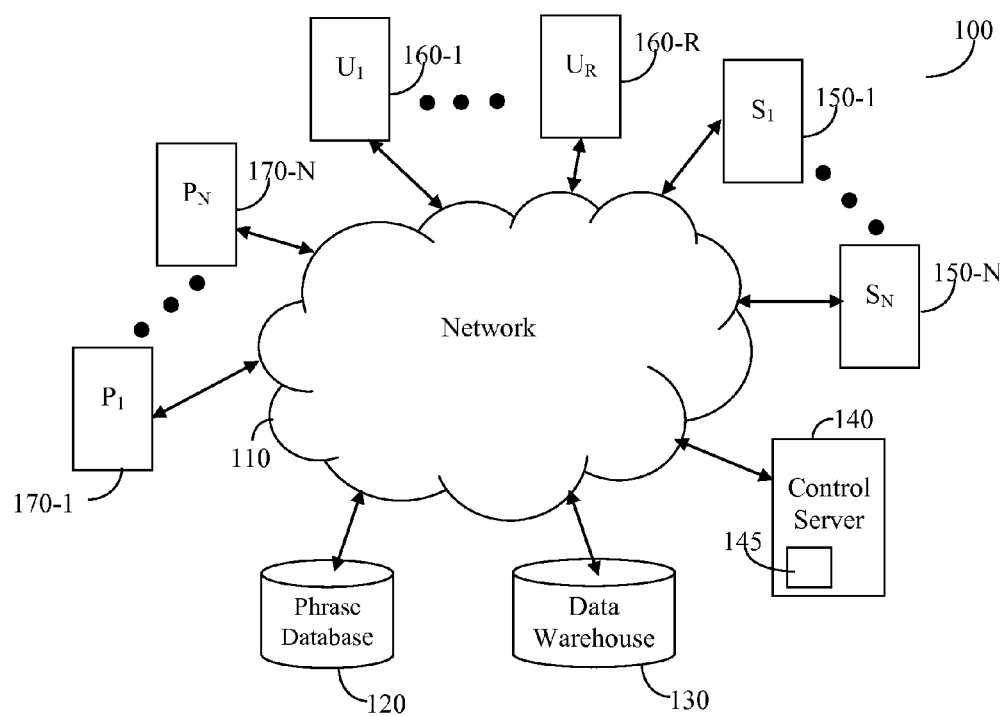
FIG. 1 is a schematic diagram of a system for creation of term taxonomies by mining web based user generated content.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein include detection of implicit demographic information related to a user. Implicit information refers to information that is neither explicitly revealed by the user nor can be directly derived from without further analysis. In one embodiment, information related to a user of a social network, which is not revealed, is identified based on one or more probabilistic models. In another embodiment, the detection of the implicit demographic information may be achieved by correlating information received from a plurality of data resources.

The disclosed techniques for identifying implicit demographic information are realized through a system that is also configured to collect the data respective of terms and grouping the terms in usable forms. The data collection process includes crawling designated sources of content, such as social networks, and the creation of taxonomies of terms based, for example, on a predefined dictionary of terms of interest.

FIG. 1 depicts an exemplary and non-limiting schematic diagram of a system 100 utilized for detecting implicit demographics according to one embodiment. The system 100 can also be utilized to create term taxonomies. To a network 110 there are connected various components that comprise the system 100. The network 110 can be a local area network (LAN), a wide area network (WAN), a metro area network (MAN), the world wide web (WWW), the Internet, the like, and combinations thereof.

A phrase database 120 is connected to the network 110 and contains identified phrases that are either preloaded to the phrase database 120 or that were detected during operation of the system as such phrases, and as further explained in greater detail herein below. Phrases may contain, but are not limited to, terms of interest, brand names, and the like. A data warehouse 130 is also connected to the network 110, for storing processed information respective of phrases and as further explained in greater detail herein below. The operation of the system 100 is controlled by a control server 140 having executable code stored in a memory 145, such that the control server 140 may perform the tasks discussed in more detail herein below. The memory 145 may be any form of tangible memory.

While the processing may be performed using solely the control server 140, embodiments disclosed herein may include one or more processing units 170-1 through 170-N which allow for handling of the vast amount of information needed to be processed, without departing from the scope of the invention.

Also connected to the network 110 are one or more sources of information 150-1 through 150-N. These may include, but are not limited to, social networks, e.g., Google+®, Facebook®, Twitter™, web pages, blogs, and other sources of textual information. Typically, a plurality of users using user nodes 160-1 through 160-R access the information sources 150-1 through 150-N periodically and provide their own comments and information therein. According to the teachings disclosed herein, it is these types and pieces of information that are used by the system 100 for its operation which is described in further detail with respect to FIG. 2. These types and pieces of information are processed by the system 100.

A user node 160-j (j=1, . . . , R) is a computing device operated by a user. A user node may include, but is not limited to, a personal computer, a smart phone, a mobile phone, a tablet computer, or any type of device that enables connectivity to the Internet.

Figure 2:
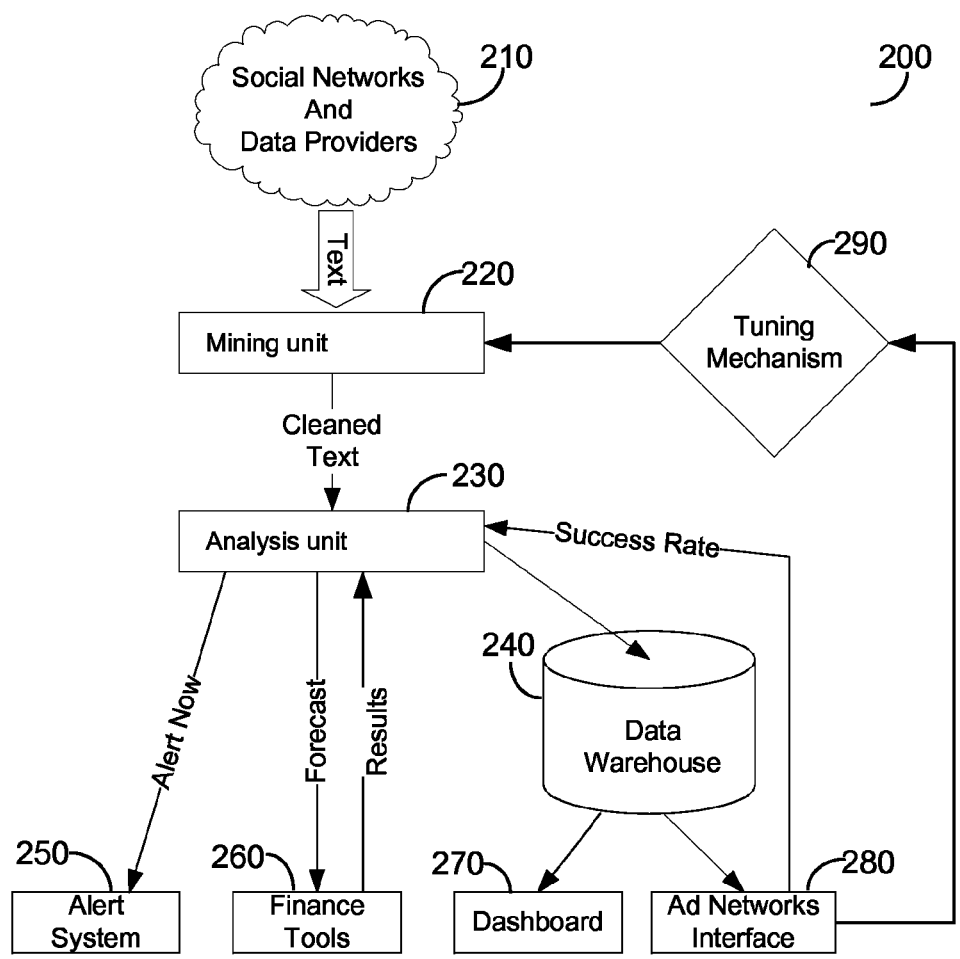
FIG. 2 is an overview block diagram of the operation of the system.

FIG. 2 shows an exemplary and non-limiting overview block diagram 200 of the operation of the system 100. One or more data sources 210, including, but not limited to, social networks and other user provided sources of information 210 are checked and or regularly supplied for text to be provided to a mining process. These types and pieces of information are processed by the system 100. The access to the data sources 210 is through the network 110 by means of a network interface (not shown). In an embodiment disclosed herein, the mining process can be executed by a mining unit 220 of the system 200.

The task of the mining process is to extract from the text all irrelevant data that cannot be effectively used in the analysis that is performed by the system. Basically, the mining task is to identify sentiment phrases and non-sentiment phrases. In addition to sentiment extraction, the mining process "cleans" the data collected. Sentiment phrases may include, but not by way of limitation, words such as "love", "hate", "great", "disaster", "beautiful", "ugly" and the like, but also "not good", "great time", "awfully good", and more. Cleaning of data may include phrases common in social networks such as, but of course not limited to, conversion of "GRREEEAT!" into "great", and so on. In addition, cleaning may include removing conjunctions and words that appear with extremely high frequency or are otherwise unknown or irrelevant. While single words have been shown here, multiple words grouped as a phrase may also be treated as a sentiment phrase, such as but not by way of limitation, "great experience", "major issues", "looks great" and more. These words describe a sentiment typically applied to a non-sentiment phrase.

The text received from the one or more data source(s) 210 is mined for such phrases, for example, by using a reference for phrases stored in a database, such as the phrase database 120. The mining process includes understanding that a complex phrase such as "I hate I Love Lucy" actually contains a sentiment phrase "love" and a non-sentiment phrase "I Love Lucy", where the word "love" in the non-sentiment phrase is not to be analyzed as a standalone phrase. Furthermore, the sentence "I saw the movie I Love Lucy" does not comprise any sentiment phrase, and therefore would not cause the mining unit 220 using the mining process to associate a sentiment phrase to the non-sentiment phrase. The phrases database 120, in one embodiment, is a preloaded database and is updated periodically. However, it is also possible to automatically update the phrase database 120 upon detection of a phrase as being either one of a sentiment phrase or a non-sentiment phrase. Furthermore, a sentiment phrase within a non-sentiment phrase is ignored for this purpose as being a sentiment phrase and is only treated as part of the non-sentiment phrase. It should therefore be understood that a term taxonomy is created by association of a non-sentiment phrase with a sentiment phrase. Hence, for example, in the context of the phrase "I hate I Love Lucy" the sentiment phrase is "hate", the non-sentiment phrase is "I Love Lucy" and the phrases are associated together in accordance with the principles of the invention to create a taxonomy.

According to another embodiment, a comparative numerical value is associated with each sentiment. For example, the word "love" may have a score of "10", the word "indifferent" the score of "0" and "hate" the score of "−10". Hence, positive sentiments would result in a positive score while negative sentiments would result in a negative score. Such score associations may be performed initially manually by a user of the system, but over time the system 200, based on a feedback provided by, e.g., a tuning mechanism 290, can position the sentiment phrases relative to each other to determine an ever changing score value for every sentiment phrase. This is of high importance as language references change over time and references which may be highly positive can become negative or vice versa, or decline or increase as the case may be. This can be achieved by aggregation of sentiments with respect to a specific non-sentiment phrase resulting in a taxonomy that reflects the overall sentiment to the non-sentiment phrase.

In an embodiment, a weighted sentiment score corresponding to a plurality of sentiment phrases collected for a respective non-sentiment phrase is generated. That is, within a specific context, the plurality of sentiments associated with a non-sentiment phrase is collected, and then an aggregated score is generated. The aggregated score may be further weighted to reflect the weight of each of the individual scores with respect to other scores.

The cleaned text that contains the phrases is now processed using an analysis process which in an embodiment is performed by an analysis unit 230 of the system 200. The analysis may provide based on the type of process information needed, the likes of alerts and financial information. An alert may be sounded by an alert system 250 when it is determined that a certain non-sentiment phrase, for example, a certain brand name, is increasingly associated with negative sentiment phrases. This may be of high importance as the manufacturer associated with the brand name would presumably wish to act upon such negative information as soon as possible in real-time. Likewise, a positive sentiment association may be of interest for either supporting that sentiment by certain advertising campaigns to further strengthen the brand name, or by otherwise providing certain incentives to consumers of products of the brand name. One of ordinary skill in the art should readily realize the opportunities the systems 100 and 200 provide.

Returning to FIG. 2, the analyzed data is stored in a data warehouse 240, shown also as data warehouse 130 in FIG. 1. Through a dashboard utility 270 it is possible to provide queries to the data warehouse 240. An advertisement network interface 280 further enables advertising related management, for example, providing advertisements relative to specific phrases used. In addition, the information is tuned by a tuning mechanism 290 thereby allowing for feedback to enable better mining of the data by the mining unit 220. In the case of an advertisement a success rate, for example conversion rates, is also provided to the analysis process for better analysis of the cleaned text by creating real time taxonomies.

An analysis may further include grouping and classification of terms in real-time, as they are collected by the system. Furthermore, current trends can be analyzed and information thereof provided, including, without limitation, an inclining trend and a declining trend with respect to the sentiment phrase associated with a non-sentiment phrase. Moreover, using the analysis process performed by the analysis unit 230 it is possible to detect hidden connections, i.e., an association between non-sentiment phrases that have a proximity correlation. The analysis unit 230 hence detects direct and hidden connections between non-sentiment phrases, and all connections between the non-sentiment phrases.

As will be described below connections are identified based one or more proximity rules. In an embodiment, non-sentiment phrases that have a hidden connection can be associated with a sentiment phrase. For example, if a web site of a talk show refers more positively or more frequently to a specific brand name product, the analysis unit 230 can find the correlation or connection between non-sentiment phrases that have a hidden connection and then compare the sentiment phrases thereof. That way, if the talk show web site tends to favor and recommend that specific product, it would make more sense to spend, for example, advertisement money there, than if the sentiment phrase would be a negative one. In one embodiment, a hidden connection is any one of a first degree separation of two non-sentiment phrases, and a first degree separation of the two different non-sentiment phrases that are associated with a common non-sentiment phrase.

Figure 3:
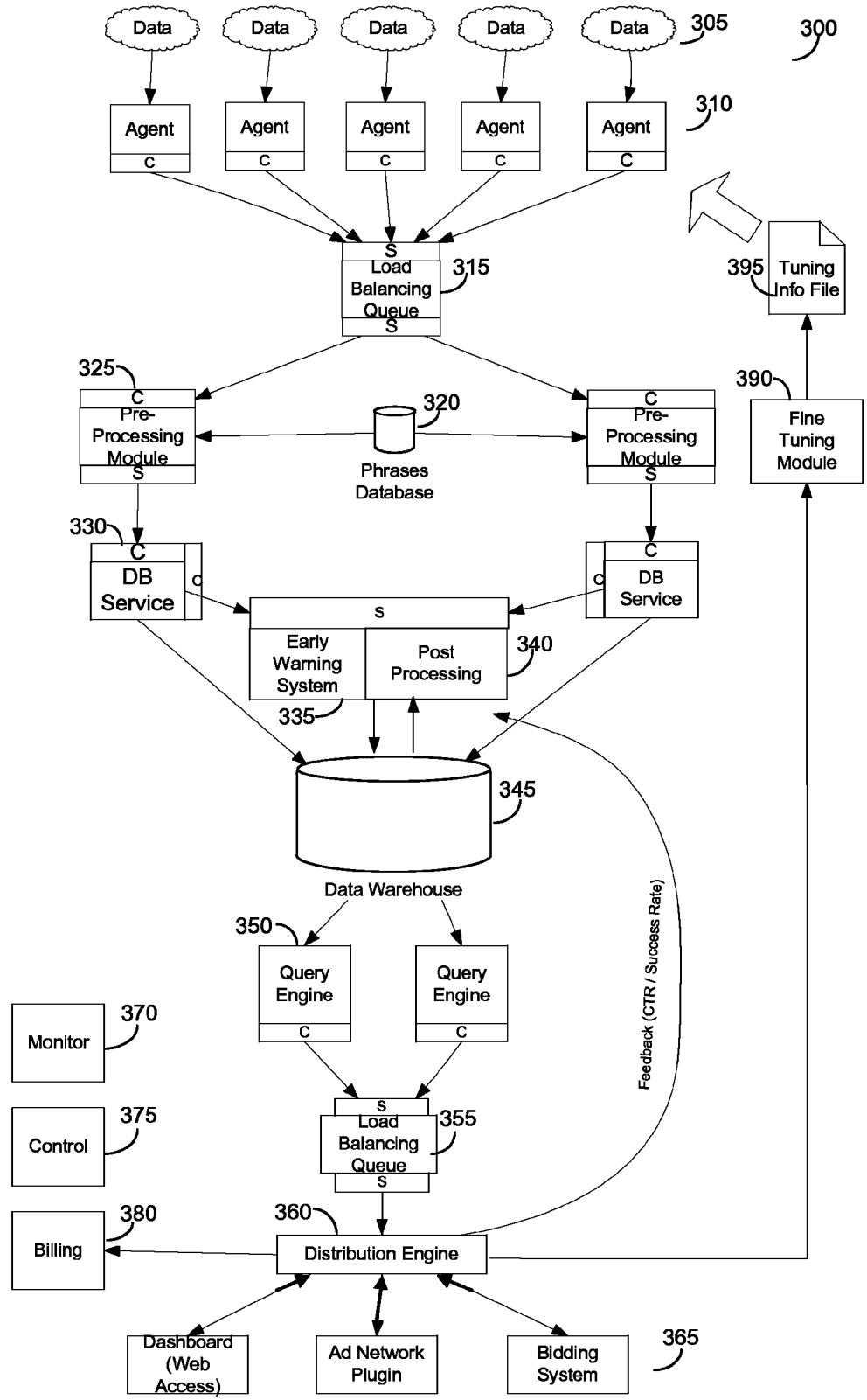
FIG. 3 is a detailed block diagram of the operation of the system depicted in FIGS. 1 and 2.

FIG. 3 shows an exemplary and non-limiting detailed block diagram of the operation of a system 300 according to the certain embodiment discussed herein. Data sources 305, including the web sites and web services such as Google+®, Facebook® and Twitter™, but not limited thereto, are probed periodically by agents 310 of the system 300. The agents 310, in one embodiment, are operative under the control of the control server 140 or under any one of the processing units 170, when applicable. A load balancing queue 315, operative for example on the control server 140, balances the loads of the agents 310 on the execution units such that their operation does not overload any one such unit. In the exemplary and non-limiting implementation, two processing paths are shown, however, more paths may be used as necessary.

In one embodiment, the agents 310 are also configured to collect textual information from one or more data sources 305. Each processing unit, for example, one or more of the processing units 170, performs an extraction of explicit information related to the user from the collected textual content. In one embodiment, the explicit information may be stored in a data storage unit, such as the data warehouse 345 to which such processing units 170 are connected by means of the network 110. The post processing module 340 which may be implemented on one of the processing units 170 or on the control server 140 (of FIG. 1) is then configured to generate implicit information related to the user as further explained herein below.

The second portion of the system 300 depicted in FIG. 3, concerns the ability to query the data warehouse 345 by one or more query engines 350, using a load balancing queue 355 as may be applicable. The queries may be received from a plurality of sources 365 including, but not limited to, a dashboard for web access, an advertisement network plugin, and a bidding system. The sources 365 are connected to a distribution engine 360 that receives the queries and submits them to the load balancing queue 355 as well as distributing the answers received thereto. The distribution engine 360 further provides information to a fine tuning module 390, executing for example on the control server 140, and then to an exemplary and non-limiting tuning information file 395. Other subsystems such as a monitor 370 for monitoring the operation of the system 300, a control 375, and a billing system 380 may all be used in conjunction with the operation of the system 300.

Figure 4:
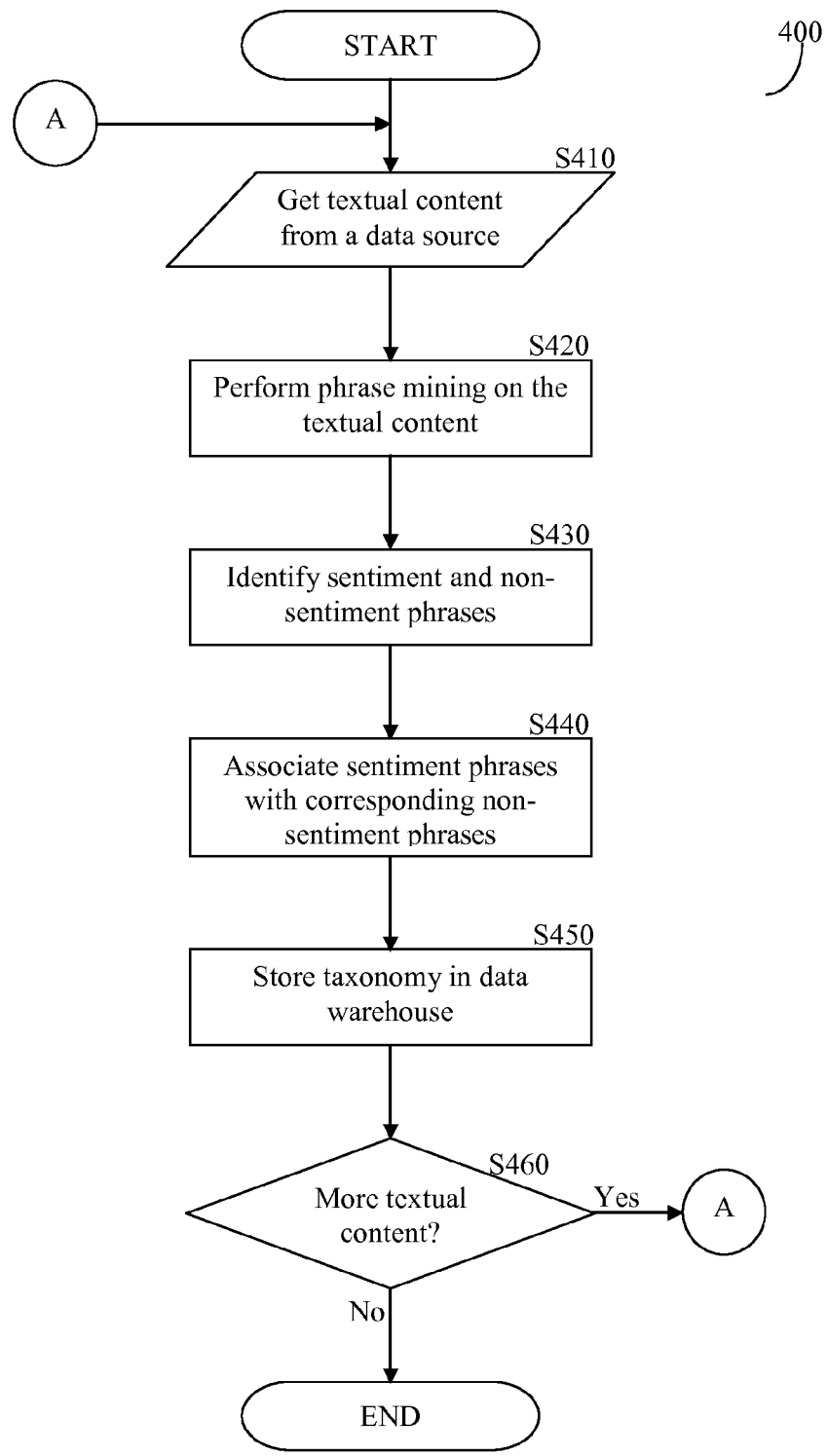
FIG. 4 is a flowchart describing a method for creation of term taxonomies by mining web based user generated content.

FIG. 4 shows an exemplary and non-limiting flowchart 400, a method for creation of term taxonomies. In S410 the system, for example and without limitations, any one of the systems 100, 200 and 300 described hereinabove, receives textual content from one or more information sources. As shown above this can be performed by using the agents 310. In S420, phrase mining is performed. The phrase mining includes at least the detection of phrases in the received content and, in S430, identification and separation of sentiment and non-sentiment phrases. In S440, sentiment phrases are associated with non-sentiment phrases as may be applicable to create term taxonomies.

One or more term taxonomies are created by association of sentiment phrases to their respective non-sentiment phrases, including but not limited to, aggregation of sentiment phrases with respect to a non-sentiment phrase. In S450, the created taxonomies then are stored, for example, in the data warehouse 130. This enables the use of the data in the data warehouse by queries as also discussed in more detail hereinabove. In S460, it is checked whether additional textual content is to be gathered, and if so execution continues with S410; otherwise, execution terminates.

Figure 5:
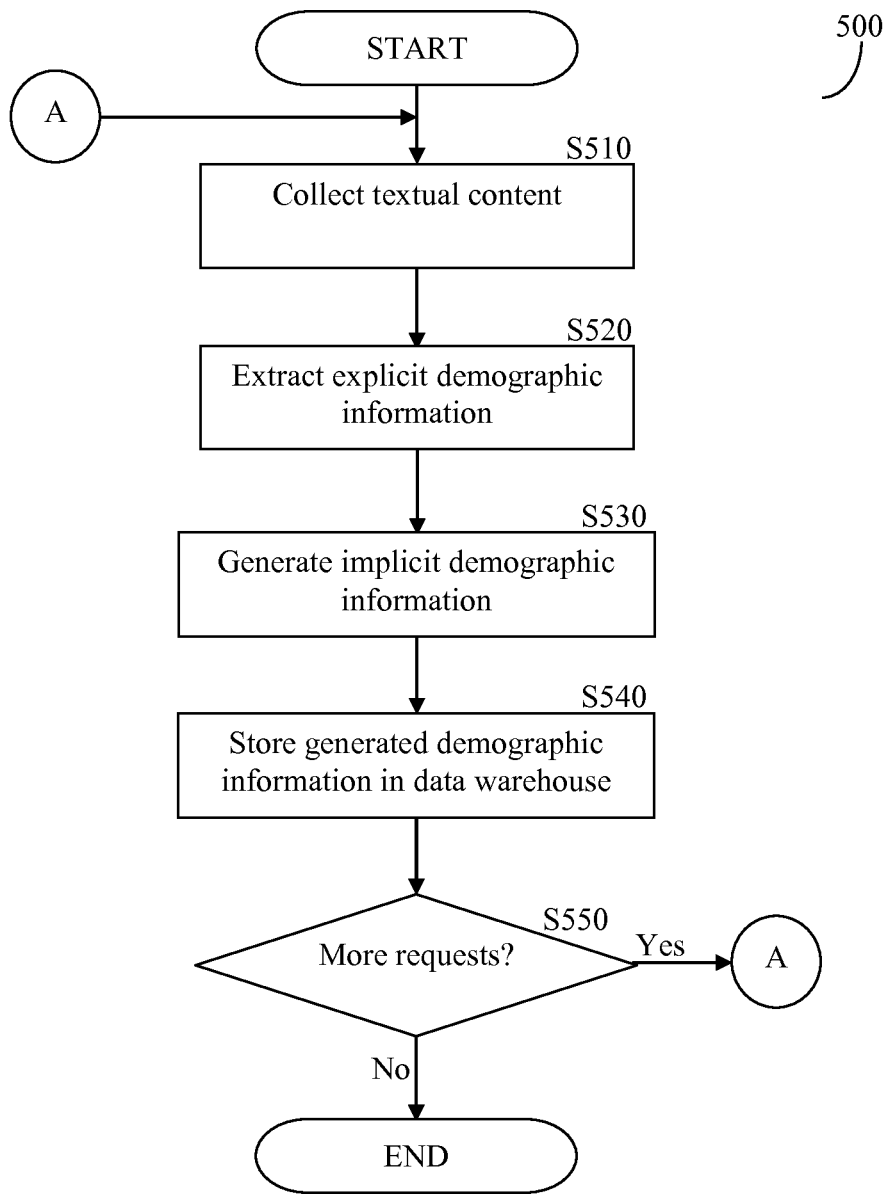
FIG. 5 is a flowchart describing the operation of identifying implicit demographic information related to a user in accordance with one embodiment.

FIG. 5 shows an exemplary and non-limiting flowchart 500 describing the operation of identifying implicit demographic information related to a user in accordance with an embodiment. In S510, one or more agents 310 collect textual content related to a user from one or more data sources. A data source, in one embodiment, may include Google+®, Facebook®, Twitter®, and the like. The collected textual content may include demographic information related to the user that is either explicitly revealed by the user or that can be derived from analysis of the collected information. Such demographic information may include, for example, the user's age, gender, relationship status, location, home address, work, hobbies, contacts and other parameters relating to the user and/or the user's behavior. According to another embodiment, the system, for example and without limitations, any one of the systems 100, 200 and 300 described hereinabove, may be used to authenticate demographic information that is revealed by the user.

In S520, explicit demographic information is extracted from the collected textual content by one or more of the processing units 170. The explicit demographic information is typically directly revealed by the user, and/or by people who know the user. According to another embodiment, the extraction of the explicit demographic information is performed by phrase mining of the textual content, for example, by the mining unit 220 discussed in detail above. As an example, in order to identify a user's age or relationship status, an extraction is performed with respect of at least a data source, for example Facebook®, in order to identify the user's age. For example, posts on the user's Facebook® wall, such as "just turned 50" posted by the user or "best wishes to your $50^{th}$ birthday", are processed by the mining unit to determine that the user's age is 50. According to another embodiment, an extraction of explicit information related to the user's common activities through the one or more sources of information such as data sources 305 is performed by one or more of the processing units 170. Explicit information may be, for example, the user's typing speed, the user's language proficiency, the average age of persons that typically interact with the user, the time of the day the user is usually active in the one or more data sources, and so on.

In S530, implicit demographic information related to the user is derived based on an analysis of the explicit demographic information related to the user. In one embodiment, a piece of implicit demographic information is derived when such information is not explicitly (directly) provided by the user. In an exemplary embodiment, the implicit demographic information is derived by correlating filtered textual content related to a certain piece of explicit demographic information (e.g., gender) respective of the user. For example, if the user's home town was not explicitly revealed, the processing analysis 170 can determine this type of information from collected textual content. As an instance, the agents 310 collect posts from a Facebook® Wall (page) of the user including "Go New York Knicks!!!", "another busy day at NYU", and "having pizza with friends at Times Square". These posts are filtered and by means of the phrase mining unit it is determined that each post can be associated with a location in New York City. Thus, correlation of the filtered phrases can indicate the user lives in New York City. The determination can also be based on the frequency that the phrases related to New York City appear in the explicit information. For example, appearances of posts determined to be related to New York City over a long period of time would provide a good indication that the user lives there, or otherwise, at least occasionally visits New York City. It should be noted that the textual content collected from different resources can be correlated to derive the implicit demographic information.

In another embodiment, the implicit demographic information can be derived from the explicit user-provided information by using at least one probabilistic model. The processing units 170 determine what the likelihood is that a certain piece of explicit demographic information contains the user's demographic. As noted above, the explicit demographic information is derived from the collected content. As an example, if the average age of the user's contacts in Facebook® is 26, the system is configured to generate the probability that the user's age is 26 and may further define the likelihood of the user being either older by a few years or younger by a few years, i.e., the range around the determined average. This is further explained with respect of FIG. 6 herein below.

In S540, the implicit and explicit demographic information detected is stored in a data warehouse. In S550, it is checked whether there are more requests and if so, execution continues with S510; otherwise, execution terminates.

Figure 6:
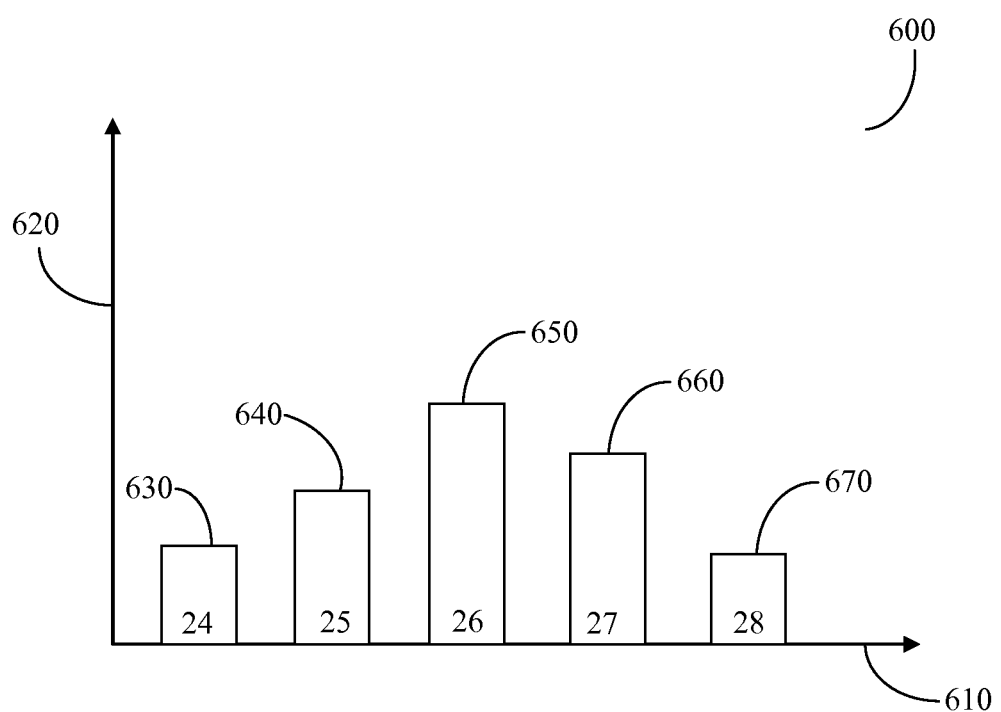
FIG. 6 is a graph describing the operation of detecting implicit demographic information respective of explicit information provided by the user according to one embodiment.

FIG. 6 shows an exemplary and non-limiting graph 600 describing the operation of identifying implicit demographic information related to a user in accordance with an embodiment. First, the explicit ages revealed by the user's contacts are extracted. This can be performed either by retrieving such information from the data warehouse for contacts that their age, or have been identified by extracting their age from the collected information as discussed above. In the exemplary FIG. 6, axis 610 represents the ages of the user's contacts. Axis 620 represents the frequency i.e., how many of the user's contacts are of each age group. The columns 630, 640, 650, 660, and 670 represent the amount of contacts the user has in ages 24, 25, 26, 27, and 28 respectively. Respective of the identified ages and the frequency of their appearance among the user's contacts, the system is configured to generate the age of the user in different probabilities using one of the probabilistic models known in the art.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for detecting hidden demographic information related to a user, comprising:
   a network interface for accessing of one or more data sources;
   a plurality of agents for collecting textual information from the one or more data sources;
   a processing unit;
   a data warehouse; and
   a memory coupled to the processing unit that contains therein instructions that when executed by the processing unit configures the system to:
      analyze the collected textual information to detect phrases in the textual information and separate between sentiment phrases and non-sentiment phrases in the detected phrases, wherein any sentiment phrase and any non-sentiment phrase that contains one or more proper name contains at least one word that is not part of the one or more proper name;
      extract, from the detected phrases, explicit demographic information revealed by the user;
      generate implicit demographic information related to the user based on the non-sentiment phrases and on a frequency that the non-sentiment phrases appear in the non-sentiment phrases from which is extracted explicit demographic information; and,
      store the identified explicit and implicit demographic information in the data warehouse.

2. The system of claim 1, wherein the plurality of agents are further configured to collect data respective of the user's common activity with respect of the one or more data sources; and, to store the data collected in the data warehouse.

3. The system of claim 2, wherein the user's common activity is at least one of: a typing speed, language proficiency, time of the day the user is usually active in the one or more data sources.

4. The system of claim 1, wherein the one or more data sources are at least one of: a social network, a blog, a news feed, and a web page.

5. The system of claim 1, wherein the implicit demographic information is at least one of the following statistics characterizing the user: user age, gender, relationship status, location, home address, work, hobbies, contacts, and at least one parameter related to a behavior of the user.

6. The system of claim 1, wherein the system is further configured to authenticate implicit demographic information revealed by the user.

7. The system of claim 1, wherein the system is further configured to determine at least a probability of the implicit demographic information.

8. A method for detecting implicit demographic information related to a user, comprising:
   collecting textual information from one or more data sources;
   analyzing, by a data mining system, the collected textual information to detect phrases in the textual information and separate between sentiment phrases and non-sentiment phrases in the detected phrases, wherein any sentiment phrase and any non-sentiment phrase that contains one or more proper name contains at least one word that is not part of the one or more proper name;
   extracting, from the detected phrases, explicit demographic information revealed by the user;
   generating implicit demographic information related to the user based on the non-sentiment phrases and based on a frequency that the non-sentiment phrases appear in the non-sentiment phrases from which is extracted explicit demographic information; and
   storing the explicit and implicit identified demographic information in a data warehouse.

9. The method of claim 8, wherein the extraction further comprises:
   collecting data respective of the user's common activity with respect of the one or more data sources; and
   storing the data collected in the data warehouse.

10. The method of claim 9, wherein the user's common activity is at least one of: a typing speed, language proficiency, time of the day the user is usually active in the one or more data sources.

11. The method of claim 8, wherein each of the one or more data sources is at least one of: a social network, a blog, a news feed, and a web page.

12. The method of claim 8, wherein the implicit demographic information includes at least one of the following statistics characterizing the user: an age, a gender, a relationship status, a location, a home address, an occupation, hobbies, contacts, and at least one parameter related to a behavior of the user.

13. The method of claim 8, further comprising:
   authenticating implicit demographic information revealed by the user.

14. The method of claim 8, further comprising:
   determining at least a probability of the implicit demographic information.

15. A non-transitory computer readable medium having stored thereon instructions for causing one or more processing units to perform a process comprising:
   collecting textual information from one or more data sources;
   analyzing, by a data mining system, the collected textual information to detect phrases in the textual information and separate between sentiment phrases and non-sentiment phrases in the detected phrases, wherein any sentiment phrase and any non-sentiment phrase that contains one or more proper name contains at least one word that is not part of the one or more proper name;
   extracting, from the detected phrases, explicit demographic information revealed by the user;
   generating implicit demographic information related to the user based on the non-sentiment phrases and based on a frequency that the non-sentiment phrases appear in the non-sentiment phrases from which is extracted explicit demographic information; and
   storing the explicit and implicit identified demographic information in a data warehouse.

16. The system of claim 1, wherein the system generates at least one item of implicit demographic information related to the user based on the non-sentiment phrases and on a frequency that non-sentiment phrases related to each of the at least one item of the implicit demographic information appear in all of the non-sentiment phrases from which the explicit demographic information was extracted.

17. The method of claim 8, wherein the generating generates at least one item of implicit demographic information related to the user based on the non-sentiment phrases and on a frequency that non-sentiment phrases related to each of the at least one item of the implicit demographic information appear in all of the non-sentiment phrases from which the explicit demographic information was extracted.

18. The non-transitory computer readable medium of claim 15, wherein the non-transitory computer readable medium causes generating at least one item of implicit demographic information related to the user based on the non-sentiment phrases and on a frequency that non-sentiment phrases related to each of the at least one item of the implicit demographic information appear in all of the non-sentiment phrases from which the explicit demographic information was extracted.

* * * * *